Aug. 27, 1929.  B. E. BIRD  1,726,465
JAR CAP REMOVING IMPLEMENT
Filed Oct. 27, 1925

Inventor
B. E. Bird
By Watson E. Coleman
Attorney

Patented Aug. 27, 1929.

1,726,465

UNITED STATES PATENT OFFICE.

BERTHA E. BIRD, OF STARKS, MAINE.

JAR-CAP-REMOVING IMPLEMENT.

Application filed October 27, 1925. Serial No. 65,223.

This invention relates to jar tongs such as are used for removing jar covers or lids, and particularly relates to a device for removing the jar covers or lids from hermetically filled fruit jars where the vacuum within the jar or the adhesiveness between the lid and the sealing ring causes the lid to stick so tight that some means must be used for breaking the seal, and for use with those jars wherein the lid is initially held down by a clamp, such jars requiring not only that the clamp shall be detached but that means shall be used to break the adherence between the ring and the jar cap.

My invention is illustrated in the accompanying drawing, wherein:—

Figure 1:
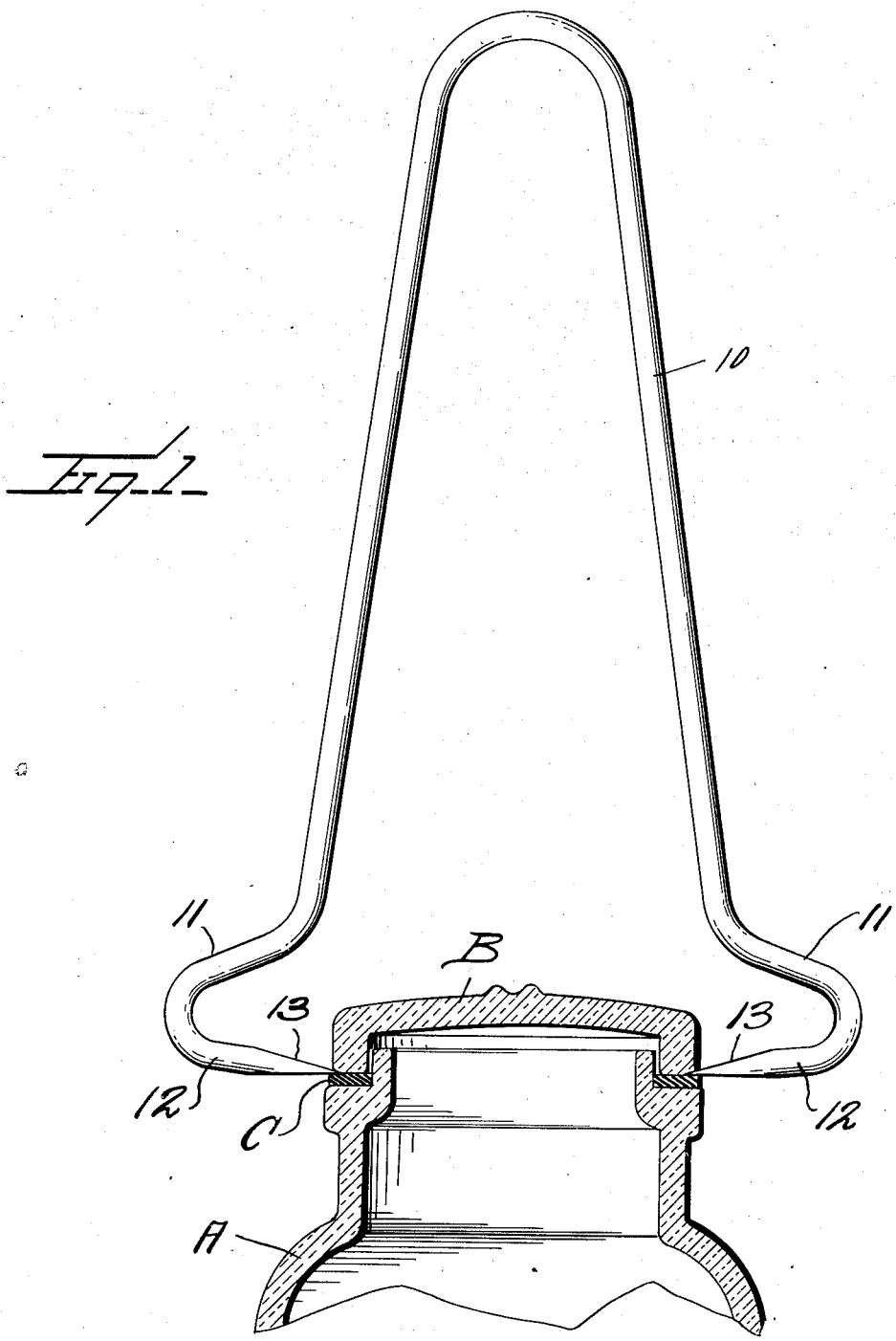
Figure 1 is a vertical sectional view of a preserve jar with my improved lid-removing device in use therewith, the device being shown in elevation.
Figure 2:
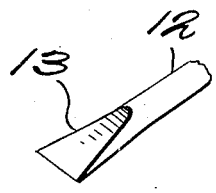
Figure 2 is a fragmentary perspective view of the end of one of the jaws.

Referring to this drawing, it will be seen that my device comprises a handle 10 and jaws 11. This handle 10 is formed of a single piece of resilient metal which is bent upon itself so as to form the two tangs of the handle. The lower end of each tang is outwardly bent, as at 11, to form a jaw and then inwardly extended, as at 12, nearly at right angles to the handle shank or tang and the extremities of these portions 12 are beveled, as at 13. The jaws are large enough to span the neck of the ordinary preserve jar or canning jar, and when it is desired to remove the lid or top of the can the clamp holding the lid in place, if the lid remover is being used with a certain type of jar, is removed and then the jaws are engaged on each side of the lid, as illustrated in Figure 1, and the jaws closed firmly into engagement beneath the lid, the wedge-shaped ends of the jaws being forced between the lid and the rubber ring between the lid B and the rubber ring C or between this rubber ring C and the body of the jar A. When this has been accomplished it is an easy matter to force the lid or cover off of the jar top.

Obviously where this device is used with jars which are sealed hermetically and in which the lid is held pressed against the rubber gaskets by the exhaustion of air from within the jar, there is no necessity of unclamping the lid but the lid remover is simply used, as before stated, for breaking the adhesion between the rubber ring and the lid or between the rubber ring and the body of the jar and the lid is then pried off or pulled off. The lid may also be forced off by forcing the beveled ends of the jaws between the lid and the body and then giving a downward and outward swinging movement to the handle, which will cause the jaws to turn between the lid and body, thus prying off the lid.

I claim:—

A jar cap removing implement of the character described formed of a single length of resilient metal rod, approximately circular in cross section bent upon itself to provide connected handle shanks, each handle shank at its extremity being bent laterally outward nearly at a right angle to the handle shank and then extended inward toward the other shank nearly at a right angle to the handle shank to form a jaw, the extremities of the jaws being beveled transversely to the plane of the handle, the resiliency of the rod urging the jaws to an open position.

In testimony whereof I hereunto affix my signature.

BERTHA E. BIRD.